United States Patent
Allert

(10) Patent No.: US 9,716,407 B2
(45) Date of Patent: Jul. 25, 2017

(54) STANDBY POWER SUPPLY SYSTEM AND METHODS FOR ISOLATING A LOCAL POWER DISTRIBUTION NETWORK FROM A SUPERORDINATE POWER SUPPLY NETWORK

(71) Applicant: SMA Solar Technology AG, Niestetal (DE)

(72) Inventor: Claus Allert, Kaufungen (DE)

(73) Assignee: SMA Solar Technology AG, Niestetal (DE)

( * ) Notice: Subject to any disclaimer, the term of this patent is extended or adjusted under 35 U.S.C. 154(b) by 103 days.

(21) Appl. No.: 14/743,313

(22) Filed: Jun. 18, 2015

(65) Prior Publication Data
US 2015/0288224 A1 Oct. 8, 2015

Related U.S. Application Data

(63) Continuation of application No. PCT/EP2013/077101, filed on Dec. 18, 2013.

(30) Foreign Application Priority Data

Dec. 21, 2012 (DE) .................. 10 2012 113 016

(51) Int. Cl.
*H02J 7/00* (2006.01)
*H02J 9/00* (2006.01)
(Continued)

(52) U.S. Cl.
CPC ............... *H02J 9/061* (2013.01); *H02J 3/38* (2013.01); *Y10T 307/615* (2015.04)

(58) Field of Classification Search
CPC ..................... H02J 3/38; H02J 9/061
(Continued)

(56) References Cited

U.S. PATENT DOCUMENTS 5,579,197 A * 11/1996 Mengelt .................. H02J 9/062
307/66
5,886,890 A 3/1999 Ishida et al.
(Continued)

FOREIGN PATENT DOCUMENTS

DE 202010008123 10/2010
DE 102012101928 9/2012
(Continued)

*Primary Examiner* — Carlos Amaya
(74) *Attorney, Agent, or Firm* — Eschweiler & Potashnik, LLC

(57) ABSTRACT

The disclosure relates to a standby power supply system for connection to a superordinate power supply network and a local power distribution network, having a network isolation device for connecting the local power distribution network to the superordinate power supply network by means of at least two series-connected switching elements with respectively associated switching contacts and having a local power supply device with a separate-network detector for identifying a separation situation for the local power distribution network. A first of the two switching elements is connected to the superordinate power supply network and the second of the two switching elements is connected to the local power supply device. The disclosure furthermore relates to methods for isolating a local power distribution network from a superordinate power supply network.

8 Claims, 3 Drawing Sheets

(51) Int. Cl.
*H02J 9/06* (2006.01)
*H02J 3/38* (2006.01)

(58) Field of Classification Search
USPC .......................................................... 307/64
See application file for complete search history.

(56) References Cited

U.S. PATENT DOCUMENTS

| | | |
|---|---|---|
| 2005/0225090 A1 | 10/2005 | Wobben |
| 2008/0203820 A1 | 8/2008 | Kramer et al. |
| 2009/0027037 A1 | 1/2009 | Strnad et al. |
| 2009/0236917 A1 | 9/2009 | Bettenwort et al. |
| 2010/0133904 A1 | 6/2010 | Klodowski et al. |
| 2011/0006609 A1 | 1/2011 | Loh et al. |
| 2011/0204878 A1 | 8/2011 | Thorngreen et al. |
| 2012/0299383 A1* | 11/2012 | Cyuzawa ............... H02J 3/381 307/75 |
| 2013/0002031 A1 | 1/2013 | Mulkey et al. |

FOREIGN PATENT DOCUMENTS

| | | |
|---|---|---|
| EP | 0810713 A3 | 1/1999 |
| EP | 1956483 A1 | 8/2008 |
| EP | 2528181 A1 | 11/2012 |
| JP | H10023673 | 1/1998 |
| WO | 2012017068 A2 | 2/2012 |
| WO | 2012101258 A1 | 8/2012 |
| WO | 2014096009 A1 | 6/2014 |

* cited by examiner

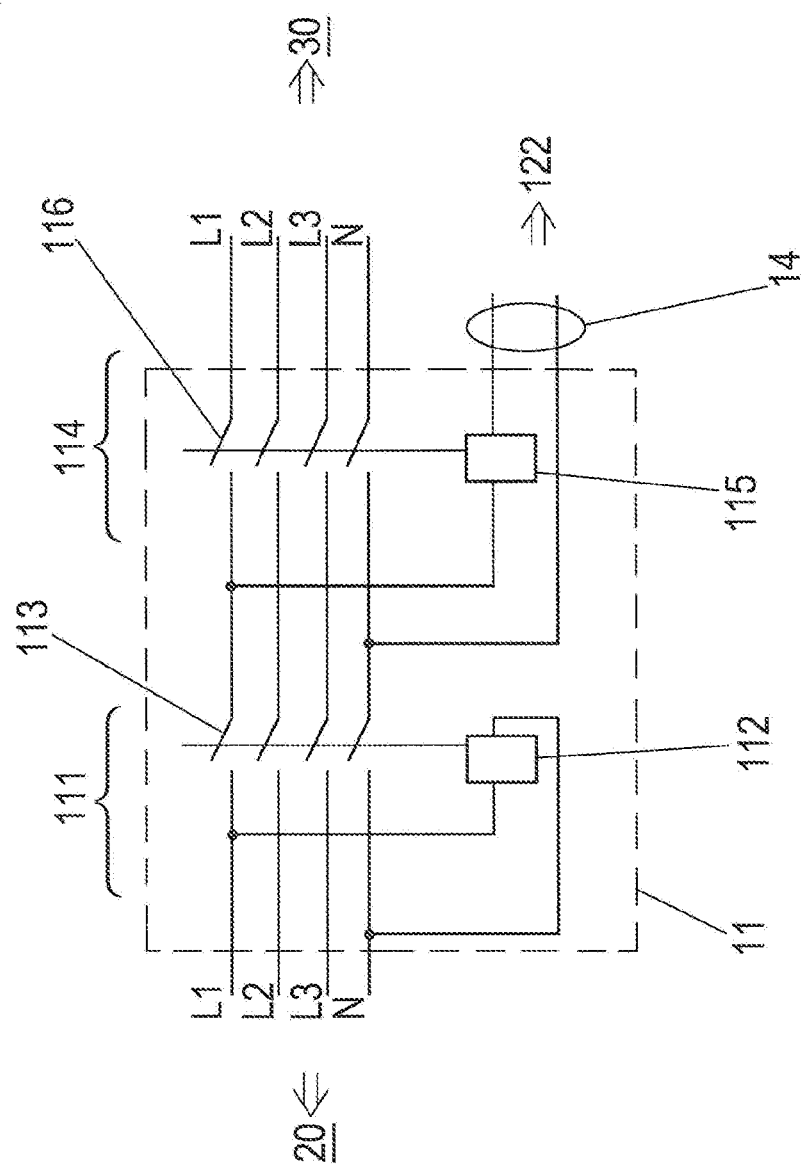

STANDBY POWER SUPPLY SYSTEM AND METHODS FOR ISOLATING A LOCAL POWER DISTRIBUTION NETWORK FROM A SUPERORDINATE POWER SUPPLY NETWORK

CROSS REFERENCE TO RELATED APPLICATIONS

This application claims priority to International Patent Application number PCT/EP2013/077101, filed on Dec. 18, 2013, which claims priority to German Patent Application number 10 2012 113 016.7, filed on Dec. 21, 2012, and is hereby incorporated in its entirety.

FIELD

The disclosure relates to a standby power supply system for connection to a superordinate power supply grid and a local power distribution grid. The standby power supply system has a grid disconnection device for connecting or disconnecting the local power distribution grid to or from the superordinate power supply grid by means of at least two series-connected switching elements, each having assigned switching contacts. The standby power supply system furthermore has a local power supply device comprising an island detector for detecting an island situation of the local power distribution grid. The disclosure furthermore relates to a method for disconnecting a local power distribution grid from a superordinate power supply grid.

BACKGROUND

Standby power supply systems are used for providing electric power for a consumer arrangement in a local power distribution grid in the case where the superordinate, possibly public power supply grid cannot provide this power. Reasons for this can be, for example, a failure of and/or a fault on the superordinate power supply grid. The standby power supply system comprises a disconnection device which, during normal operation of the superordinate power supply grid, connects the power supply grid to the local power distribution grid. In the event of a failure of and/or a fault on the superordinate power supply grid the disconnection device disconnects the local power distribution grid from the superordinate power supply grid. After disconnection of the local power distribution grid the local power supply device connects onto this local grid in order to supply power to the consumer arrangement. The local power generation device may be an inverter, which is coupled to an energy storage device, for example a battery. Such standby power supply systems for switching from a normal operating mode in the case of supply by the superordinate power supply grid to island operation in the case of supply by the local power generating unit are known, for example, from the documents EP 1 956 483 A1 and DE 20 2010 008 123 U1.

Such local power supply devices generally have an island detector in order to detect the island situation of the local power distribution grid and to implement the above-described steps. Methods for detecting such an island situation ("Anti-Islanding Detection", AID) are known, for example from the documents EP 2 003 759 A1 and EP 0 810 713 B1.

Regarding such standby power supply systems, for safety reasons it is necessary to avoid a situation in which the local power supply device supplies power to the local power distribution grid while the grid is still connected to the superordinate power supply grid. In such a situation, the safety of personnel performing maintenance work on the actually voltage-free superordinate power supply grid would no longer be ensured, for example. Therefore usually so-called contactors with priority control and a checkback contact are provided as switching elements in the grid disconnection device. By these contactors it is ensured that the checkback contact is closed when and only when all of the main contacts are actually disconnected. The checkback contact is connected to the local power supply device so that the local power supply device only supplies power to the local power supply grid when the checkback contact is closed. In addition, often two series-connected contactors are provided in order to ensure additional safety by virtue of redundancy. Compared with conventional contactors which are not provided with priority control and which are also referred to as "installation contactors", the mentioned contactors with priority control are firstly more expensive and secondly, owing to their size, cannot be used with conventional installation boxes ("service entrance boxes", "domestic subdistribution cabinet") used in domestic installation.

SUMMARY

In one embodiment a standby power supply system is disclosed which, even without any switching elements with priority control and checkback contacts, ensures that the local power distribution grid is disconnected from the superordinate power supply grid with the level of safety required by the relevant regulations before a power supply to the local grid by the local power supply device can take place.

A standby power supply system according to one embodiment of the disclosure comprises a first of the two switching elements of the grid disconnection device, for actuation thereof, connected directly to the superordinate power supply grid, and the second of the two switching elements of the grid disconnection device, for actuation thereof, connected to the local power supply device.

By directly connecting the control lines of the first switching element to the superordinate power supply grid, the switching element opens when the voltage (holding voltage) in the superordinate power supply grid is no longer sufficient for actuating the switching element, i.e. when the superordinate power supply grid fails. At this instant a disconnection of the two grids is implemented. The second of the two switching elements is actuated by the local power supply device, which identifies an island situation via the island detector and can correspondingly likewise open safely the second switching element, completely independent of the correct operation of the first switching element. Thus, in relation to the first switching element, the "single-fault safety" which is often required by grid operators is ensured without the need to use contactors with priority control.

In the case of a method according to the disclosure for disconnecting a local power distribution grid from a superordinate power supply grid, the two mentioned grids are connected by a grid disconnection device comprising at least two series-connected switching elements, each comprising switching contacts. In this case, a control contact or coil of a first of the switching elements is connected directly to the superordinate power supply grid. At least one local power supply device is provided in the local power distribution grid, the local power supply device comprising an island detector for detecting an island situation of the local power distribution grid and an internal switching element for disconnecting the local power supply device from the local power distribution grid. Furthermore, a control contact or coil is provided, via which the second switching element is connected to the superordinate power supply grid. The local power distribution grid is monitored for the presence of an island situation by means of the island detector. If an island situation is detected, the switching contacts of the second switching element are opened by opening the control contacts, and the local power supply device is disconnected from the local power distribution grid by means of the internal switching element in order to open the switching contacts of the first switching element.

In this way, the method ensures the "single-fault safety" with respect to the second switching element. Should the disconnection from the superordinate power supply grid by the second switching element fail, it is necessary to ensure that the first switching element opens safely. For this purpose, the local power supply device is disconnected from the local power distribution grid. So the local power supply device cannot feed into the local grid and no holding voltage for the first switching element is generated.

Ideally, the local power supply device monitors that the voltage in the local power distribution grid collapses for a short period of time to ensure that further power feeders, for example PV generators with the associated inverters, which may be present in the local power distribution grid also disconnect themselves from the local power distribution grid. It is thus ensured that the first switching element no longer receives a holding voltage and thus, even in the case of a fault of the second switching element, safe disconnection of the local power distribution grid from the superordinate power supply grid is realized.

BRIEF DESCRIPTION OF THE DRAWINGS

The disclosure will be explained in more detail below with reference to an exemplary embodiment with the aid of three figures, in which:

FIG. 3 shows a schematic illustration of a disconnection device for a standby power supply system.

DETAILED DESCRIPTION

Figure 1:
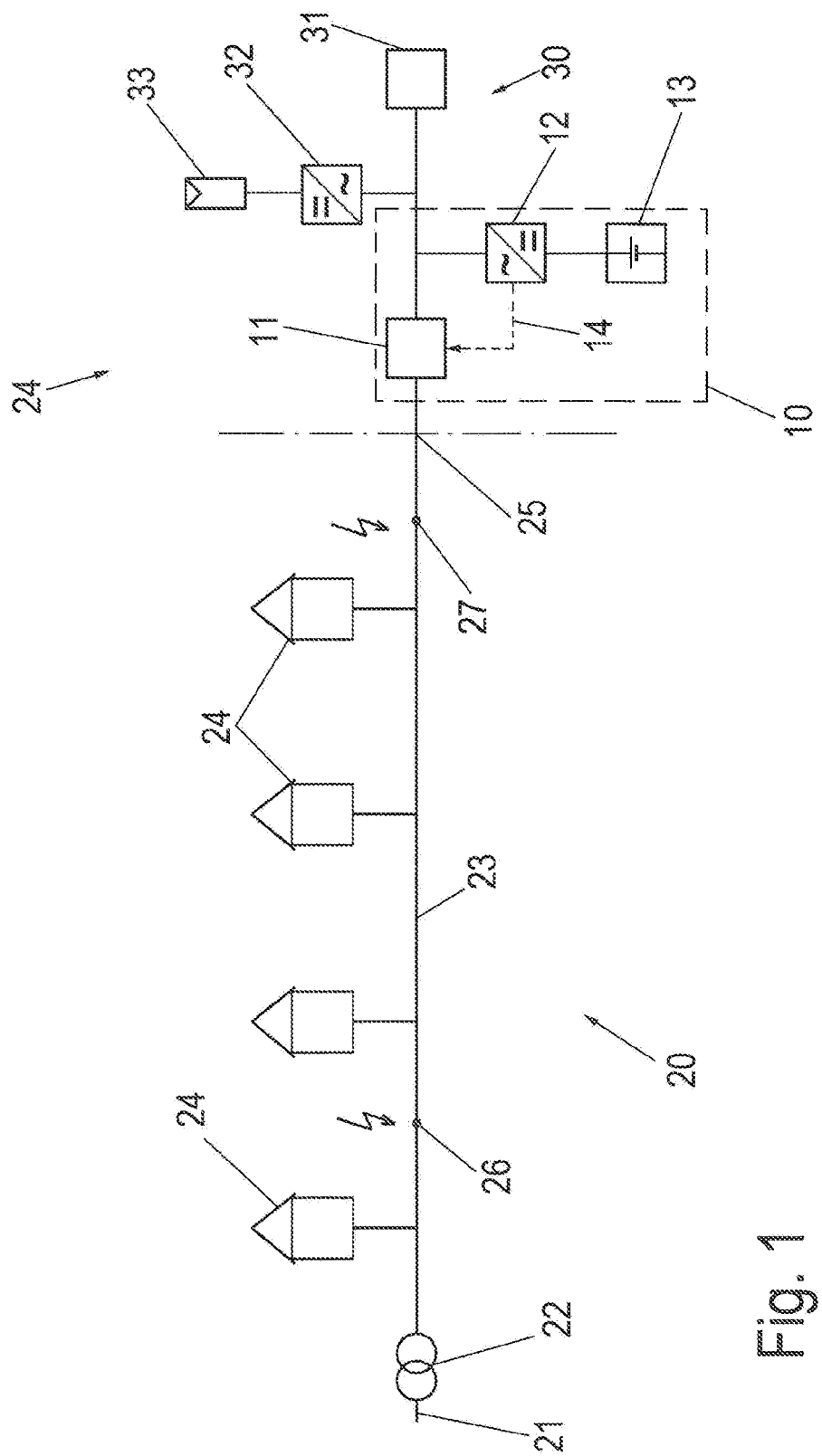
FIG. 1 shows a part of a superordinate power supply grid, to which a local power distribution grid is connected via a standby power supply system.

FIG. 1 shows in a schematic illustration, a standby power supply system 10, which is connected firstly to a superordinate power supply grid 20 and secondly to a local power distribution grid 30, to which consumers 31 are connected, inter alia.

Only one section, a so-called secondary distribution grid 23, of the superordinate power supply grid 20 is shown. Power is supplied to the secondary distribution grid 23 via a medium-voltage connection 21 and a secondary distribution grid transformer 22. A plurality of domestic installations 24 are connected to the secondary distribution grid 23.

The right-hand part of FIG. 1 illustrates in more detail one of the domestic installations 24 starting from a house transfer point 25. This domestic installation 24 comprises the standby power supply system 10 and the local power distribution grid 30. The standby power supply system 10 comprises a grid disconnection device 11 and a local power supply device 12, in this case a battery inverter with connected battery 13 as energy storage device, by way of example. The grid disconnection device 11 is actuated by the local power supply device 12 via a control line 14. In addition to the already mentioned consumers 31, furthermore a photovoltaic (PV) inverter 32 with assigned PV generator 33 is provided in the local power distribution grid 30. The PV inverter here represents, by way of example, local power feeders or local power generating units which can feed into an existing power grid but cannot build up a grid by themselves, however. The inclusion of any other desired sources is possible.

FIG. 1 shows, by way of example, two possible grid fault situations within the secondary distribution grid 23. Both situations relate to a grid failure on the basis of a disconnection of the secondary distribution grid line. Such a disconnection can occur, for example, accidentally as a result of construction work owing to the secondary distribution grid cable being severed or during the course of maintenance work. With respect to the house transfer point 25, the location of a first illustrated grid fault 26 is relatively far away with respect to a second illustrated grid fault 27, which occurs in the direct physical vicinity of the house transfer point 25. The first grid fault 26 is therefore also referred to as remote grid fault and correspondingly the second grid fault 27 is referred to as close grid fault 27. In the case of a close grid fault 27, a high-resistance disconnection of the superordinate power supply grid 30 is present, when viewed from the house transfer point 25. In the case of the remote grid fault 26, a series of domestic installations 24 are still connected to the severed secondary distribution grid cable, when viewed from the house transfer point 25. When viewed from the house transfer point 25, the remote grid fault 26 has a low resistance owing to a probably large number of consumers within the domestic installation 24 or comes close to a short-circuited secondary distribution grid cable.

Figure 2:
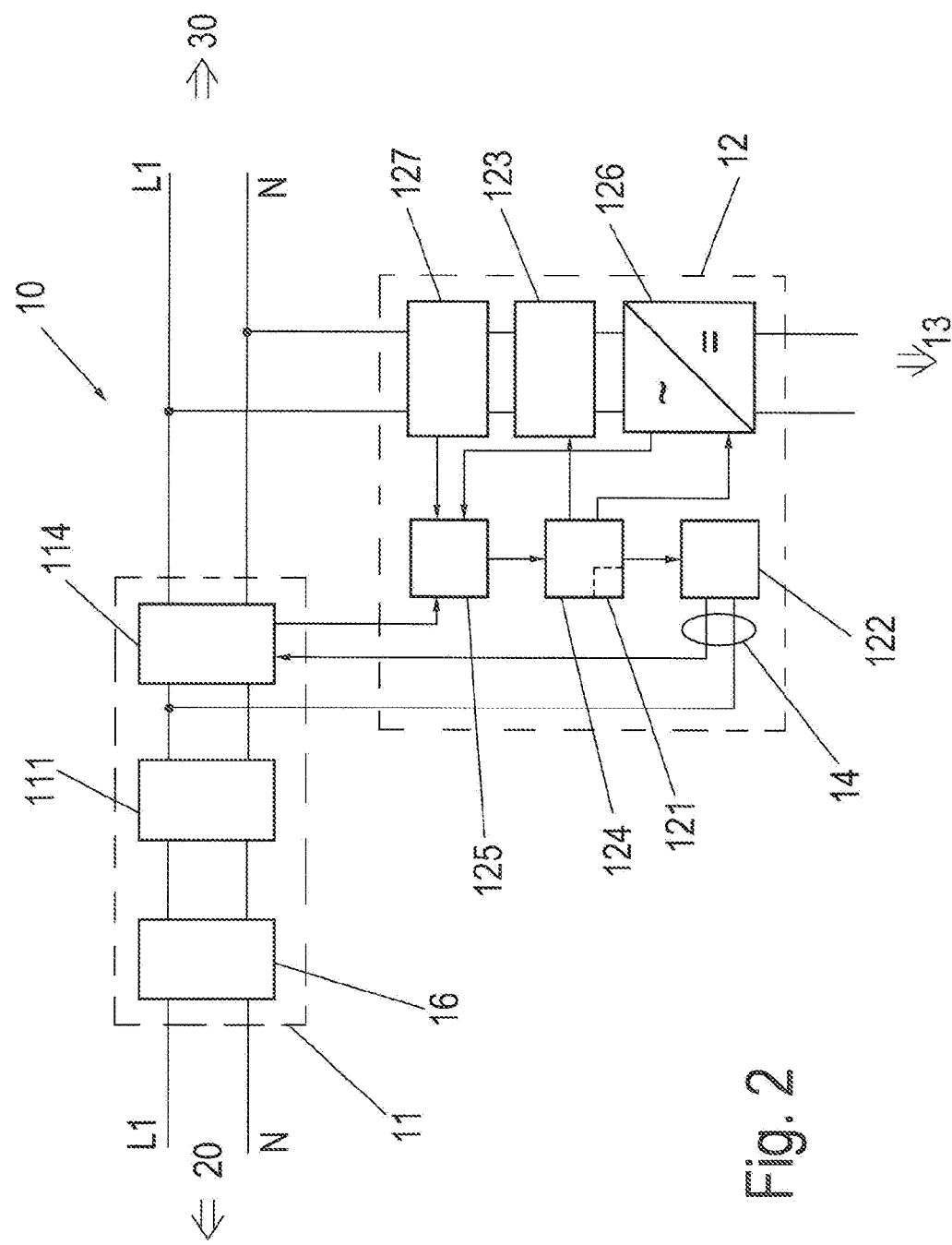
FIG. 2 shows a detailed schematic illustration of the standby power supply system shown in FIG. 1.

FIG. 2 shows, in a block circuit diagram, the design of the standby power supply system 10 in more detail. The standby power supply system 10 is connected firstly to the superordinate power supply grid 20 and secondly to the local power distribution grid 30. FIG. 2 shows, by way of example, only two connecting lines here, namely a PEN conductor N and a phase conductor L1 in each case. It goes without saying that a three-phase connection to a PEN conductor N and three separate phase lines L1 to L3 and possibly a connection to ground may also be provided. In the connection between the superordinate power supply grid 20 and the local power distribution grid 30, in the region of a grid disconnection device 11, a first switching element 111 and a second switching element 114 are arranged connected in series. The two switching elements are capable of disconnecting all poles of the two grids 20, 30 via switching contacts (not illustrated here). In addition, a grid monitoring unit 16 for the superordinate power supply grid 20 is provided, the grid monitoring unit continuing to monitor the superordinate power supply grid 20 in the event of failure of the superordinate power supply grid 20 after disconnection of the local power distribution grid 30 and the superordinate power supply grid 20. On recovery of the superordinate power supply grid 20, this recovery is signaled to the local power supply device 12 by the grid monitoring unit 16 so that, once the phase angle in the two grids 20, 30 has been synchronized, the grids can be connected to one another again.

The local power supply device 12 comprises an inverter 126, which is connected to the battery 13 (not illustrated here). On the AC side, an internal switching element 123, for example a contactor, is connected downstream of the inverter 126, as well as grid monitoring device 127 for the local power distribution grid. The inverter 126 is connected on the AC-voltage side to the local power distribution grid 30 via the internal switching element 123. This connection is in this case likewise single-phase corresponding to the configuration of the grids 20, 30. It goes without saying, in the case of polyphase grids 20, 30, that the inverter 126 and the connection to the local power distribution grid 30 may also be polyphase.

The local power supply device 12 furthermore comprises a data acquisition device 125, which is connected to a controller 124. The data acquisition device 125 receives information (measured values, status data) from the inverter 126, the grid monitoring device 127 and possibly from a checkback contact of the second switching element 114 and makes this information available to the controller 124. In an alternative configuration, it is possible for the data acquisition device 125 to be integrated in the controller 124. The controller 124 controls the functions of the standby power supply system 10, in particular the inverter 32 and the switching elements 123, 122.

Embodied as part of the controller 124 or alternatively also separately, the local power supply device additionally comprises an island detector 121. The island detector is data-connected to the grid monitoring device 127 of the local power supply grid, which monitors the grid conditions with respect to the permissible limits for voltage and frequency. These limits are sometimes differing from Nation to Nation.

The island detector 121 is capable of detecting an island situation present in the local power supply grid 30. In order to detect a present island situation, in one embodiment the detector uses known anti-islanding detection (AID) methods. For this purpose it receives the necessary measured values (voltage, current, frequency of the connected grid 30) from the grid monitoring 127 via data acquisition 125 and actuates the inverter 126 correspondingly if an active AID method is used.

The island detector 121 is set up such that an island situation is detected both when a close grid fault 27 (cf. FIG. 1) occurs and when a remote fault grid fault 26 is present. The detection of an island situation is passed on to the controller 124, which actuates the second switching element 114 via a switching contact 122 in such a way that the switching element 114 opens. The first switching element 111 is actuated directly via the superordinate power supply grid 20 and opens since there is no holding voltage available to it.

If further local energy sources are arranged in the local power distribution grid 30, for example the PV system illustrated in FIG. 1 comprising PV inverter 32 and PV generator 33, it should be ensured that the energy sources are disconnected in the event of the presence of an island situation. This maybe realized, for example, by the PV inverter 32 having an apparatus which is similar to the island detector 121 for detecting an island situation. Alternatively, it is also conceivable for the PV inverter 32 to be actuated via the island detector 121 of the standby power supply system 10.

FIG. 3 shows the design of a grid disconnection device 11, as may be used in the standby power supply system 10 in FIG. 2, for example, in more detail.

In this embodiment contactors without priority control, so-called installation contactors, are used as switching elements 111 and 114. This advantageously makes it possible for the entire grid disconnection device 11 to be integrated in conventional domestic installation boxes ("service entrance boxes", "domestic subdistribution cabinet") without dispensing with safety standards.

In FIG. 3, the grids 20, 30 are three-phase grids plus neutral line. The switching elements 111, 114 correspondingly each have four switching contacts 113, 116. Each of the switching elements 111, 114 therefore disconnects the connection between the grids 20, 30 at all poles. The switching contacts of the two switching elements 111, 114 are connected in series for each of the lines.

The switching elements 111, 114 have control coils, lines or contacts 112, 115 by which such elements may be signaled. The control coil 112 of the first switching element 111 is connected directly to the superordinate power supply grid 20. The control coil 115 of the second switching element 114 taps off its supply voltage between the switching contacts 113 and 116 of the first and second switching elements 111, 114, respectively, wherein the supply voltages are passed via the control line 14 via the switching contact 122 in the local power supply device 12. In one embodiment the two switching elements 111, 114 are so-called "normally-open contacts", i.e. if there is an insufficiently high voltage (holding voltage) present at the control coil of the switching element, the switching contacts are open.

Optionally, the second switching element 114 can be provided with a checkback contact (not shown), which is detected by the data acquisition device 125, wherein provision is then made for the internal switching element 123, via which the inverter 126 is connected onto the local power distribution grid 30, to only be switched on when the checkback contact communicates non-actuation of the switching element 114. This is an additional safety measure.

Even if, as in the embodiment in FIG. 3, switching elements 111, 114 which do not have priority control are used, the standby power supply system 10 illustrated has "single-fault safety" in respect of the mode of operation of the switching elements 111, 114.

If one or more of the switching contacts 113 of the first switching element 111 are fused, for example, and do not open correctly, the switching element 114 nevertheless opens owing to the actuation via the switching contact 122 of the local power supply device 12 once an island situation has been detected. On the other hand, if one or more of the switching contacts 116 of the second switching element 114 are fused and do not open correctly, the switching element 111 opens since there is no holding voltage available to the control coil 112 owing to the failure of the superordinate power supply grid 20.

In the case of a close grid fault 27 (cf. FIG. 1), a case may arise in which generation and consumption (by the consumers 31) can be compensated for locally at least in the short term in the case of the local power supply grid 30 in the case of the connected local power supply device 12, plus possibly further power generating units. Thus, the situation can occur in which, in the event of faulty operation of the second switching element 114, the first switching element 111 does not open although the superordinate power supply grid 20 fails since the local power supply device 12 generates the holding voltage for the control coils 112. For this case, the local power supply device 12 is disconnected from the local power distribution grid 30 by the internal switching element 123 in order to safely draw the holding voltage from the first switching element 111.

In the case where further local power generating units are provided in the local power distribution grid 30, the local power supply device 12 can, by means of its grid monitoring device 127, determine a voltage collapse of the local power supply grid 30 and thus ensure that the first switching element 111 opens. In addition, with this measure, faulty operation of the control contacts 122 is also intercepted.

Should the control contacts not open despite actuation by the power supply device, it is ensured by the controlled voltage dip that the second switching element 114 opens. The linking of the actuation to the superordinate power supply grid additionally results in the second switching element only being able to be switched on again on recovery of the superordinate power supply grid.

Once the local power distribution grid 30 has been disconnected from the superordinate power supply grid 20, the local power supply device 12 can be connected again by means of its internal switching element 123 and build up a local voltage supply. The locally recovered grid 30 is also identified by the local power generating units 32 so that the energy generating units are likewise again switched on and feed into the local power distribution grid 30. The recovery of the superordinate power supply is monitored by means of grid monitoring of the superordinate power supply grid 16 (FIG. 2) so that once the local power distribution grid 30 has been synchronized with the superordinate power supply grid 20 as regards voltage and frequency, the two grids 20, 30 can be reconnected again to one another.

The invention claimed is:

1. A method for disconnecting a local power distribution grid from a superordinate power supply grid, wherein
    the local power distribution grid and the superordinate power supply grid are connected by a grid disconnection device comprising at least two series-connected switching elements, each of the at least two series-connected switching elements having assigned switching contacts, wherein a switching contact of a first of the at least two series-connected switching elements is connected to the superordinate power supply grid, and
    at least one local power supply device is provided in the local power distribution grid, the at least one local power supply device comprising an island detector configured to detect an island situation of the local power distribution grid, an internal switching element for disconnecting the at least one local power supply device from the local power distribution grid, a control contact of a second of the at least two series-connected switching elements is connected to the superordinate power supply grid, comprising:
    monitoring the local power distribution grid for a presence of an island situation using the island detector;
    opening the second switching element by signaling the control contact thereof, and
    disconnecting the local power supply device from the local power distribution grid using the internal switching element to open the first switching element.

2. The disconnected method as claimed in claim 1, further comprising connecting the second switching element to the superordinate power supply grid via control contacts associated with the local power supply device.

3. The disconnection method as claimed in claimed 1, further comprising opening switching contacts associated with the second switching element when there is an island situation detected.

4. The disconnection method as claimed in claim 1, wherein the at least two series-connected switching elements of the grid disconnection device are installation contactors without priority control.

5. The disconnection method as claimed in claim 1, wherein the second switching element of the at least two series-connected switching elements comprises at least one checkback contact, which indicates an opening of switching contacts belonging to the second switching element.

6. The disconnection method as claimed in claim 5, wherein the checkback contact is connected to the local power supply device, and a buildup of a local power supply by the local power supply device is prevented until the checkback contact indicates opening of the switching contacts.

7. The disconnection method as claimed in claim 1, wherein the grid disconnection device is integrated in a domestic subdistribution system.

8. The disconnection method as claimed in claim 1, wherein the local power distribution grid comprises at least one local power generating unit, and
    the local power supply device, by means of the monitoring of the local power distribution grid, determines a voltage failure of the local power distribution grid,
    in the event of an incomplete collapse based on the voltage failure, wait until all of the at least one local power generating units have been disconnected from the local power supply grid;
    after complete voltage collapse of the local power supply grid based on the voltage failure, the local power supply device cancels the disconnection from the local power distribution grid by the internal switching element, and
    builds up an independent local power supply in the local power distribution grid.

* * * * *